Sept. 17, 1929.  C. B. MILLS  1,728,185
DIRECT CURRENT GYROCOMPASS
Original Filed March 15, 1921  2 Sheets-Sheet 1
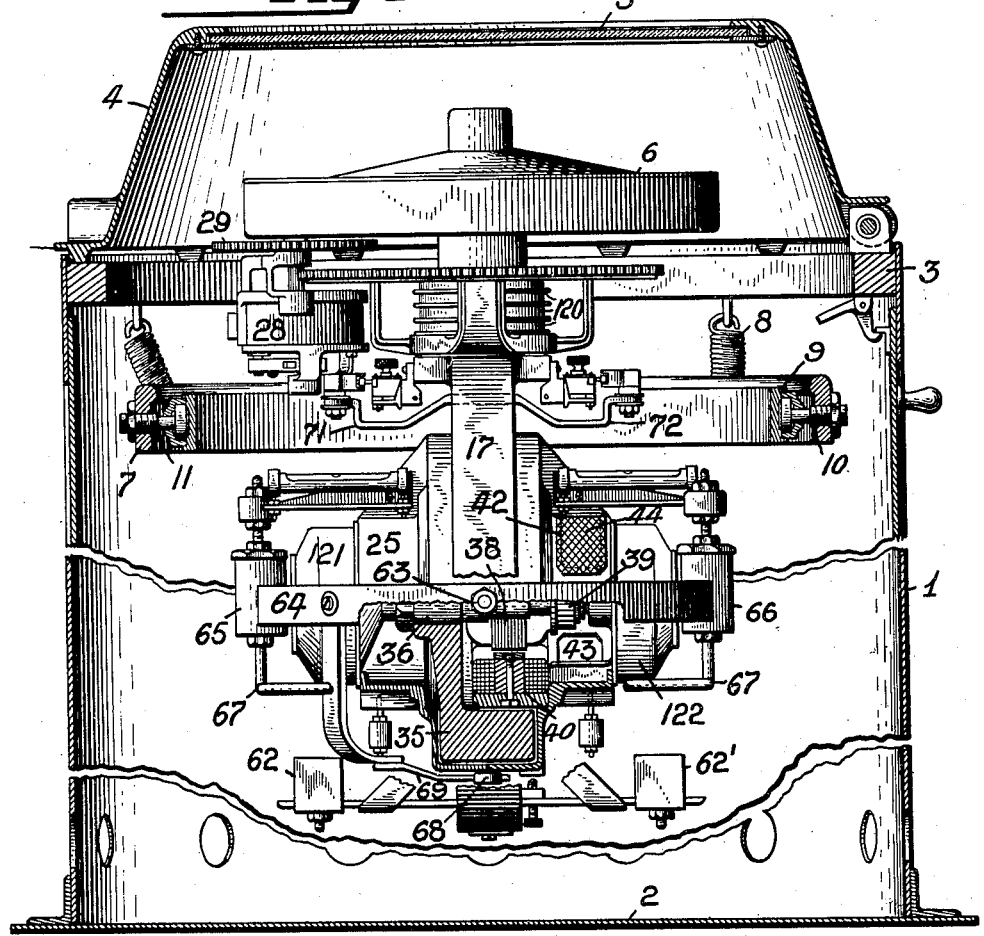
Inventor
CHESTER B. MILLS,
By his Attorney
Herbert H. Thompson Sept. 17, 1929.   C. B. MILLS   1,728,185
DIRECT CURRENT GYROCOMPASS
Original Filed March 15, 1921   2 Sheets-Sheet 2

Inventor
CHESTER B. MILLS.
By his Attorney
Herbert H. Thompson

Patented Sept. 17, 1929

1,728,185

UNITED STATES PATENT OFFICE

CHESTER B. MILLS, OF BROOKLYN, NEW YORK, ASSIGNOR, BY MESNE ASSIGNMENTS, TO SPERRY GYROSCOPE COMPANY, INC., A CORPORATION OF NEW YORK

DIRECT-CURRENT GYROCOMPASS

Application filed March 15, 1921, Serial No. 452,505. Renewed February 6, 1923.

This invention relates to gyroscopic compasses, one of the principal objects being to reduce the present high cost of these instruments. A further object of the invention is to improve the details of construction whereby compasses are rendered less sensitive to disturbing forces and more rugged in construction. A further object of the invention is to render possible the utilization of direct current for the driving of the gyro rotor instead of alternating current as has heretofore been universally employed, and the employment of a single line voltage for all the electrically driven parts.

Referring to the drawings in which what I now consider the preferred form of my invention, is shown:

Fig. 1 is a side elevation partly in section of a compass and its mounting constructed according to my invention.

Fig. 2 is a detailed top view of the trolley or contact wheel mounted on a follow-up member.

Fig. 3 is a sectional view of the trolley wheel.

Fig. 4 is a side elevation of the trolley and co-operating contact block.

Figure 5:
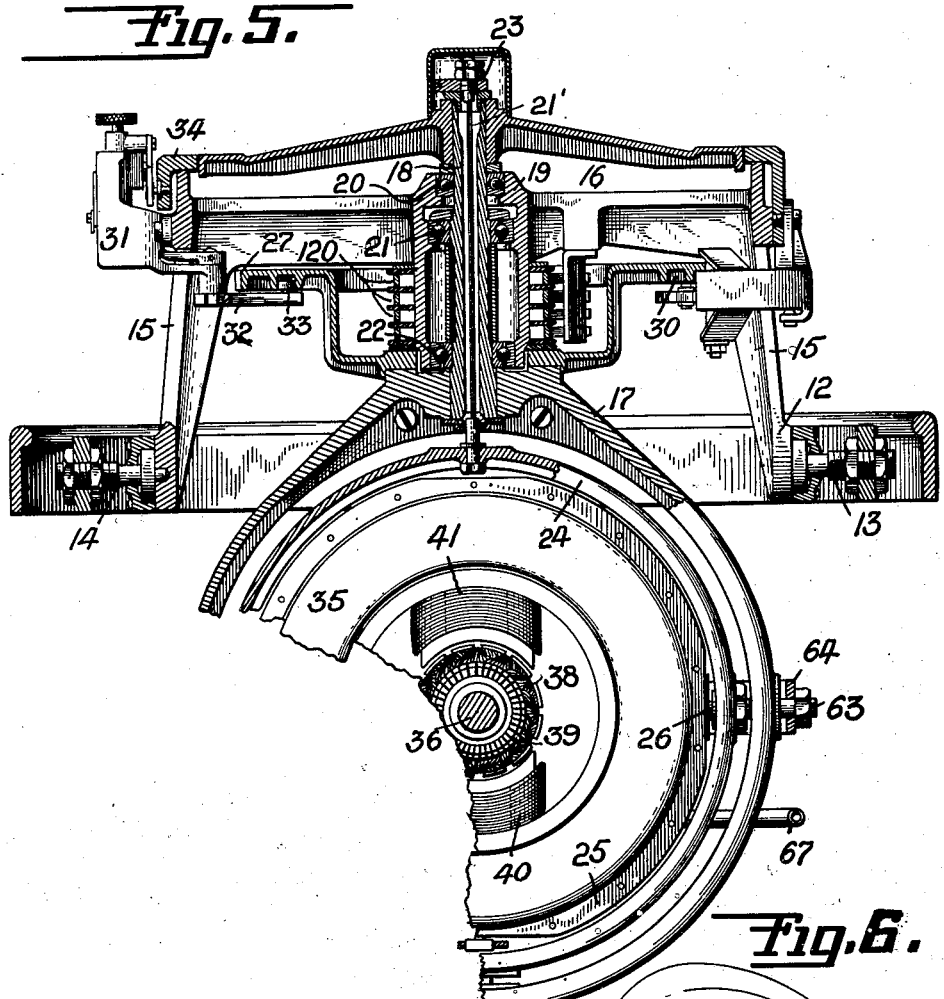
Fig. 5 is a front elevation partly in section of the gyro compass, the rear half of the rotor casing being removed to show the motor.

The compass is shown as mounted within a cylindrical housing which is preferably formed entirely of magnetic material such as sheet iron so as to shield the compass from the influence of the earth's magnetic field as hereinafter explained in detail. For this purpose the compass is closed at the bottom by an iron plate 2 as well as at the sides, although if the compass is secured to an iron deck the latter plate may be dispensed with. At the top a heavy iron ring 3 is provided for the same purpose as well as the sheet metal hinged top 4 so that even though the top 5 is of glass in order that the card 6 may be seen, the earth's field will be substantially eliminated by the mass of iron near the top. Card 6 is preferably made of solid opaque material, such as sheet metal, so that when the compass is viewed through the cover 5 the mechanism thereof is concealed by a card so that in appearance the compass is not dissimilar to a large magnetic compass. The gimbal ring 7 supporting the compass proper is shown as suspended by springs 8 from said heavy ring 3. The second ring 9 is supported on horizontal pivots 10 and 11 within ring 7, said second ring supporting, in turn, the spider 12 on horizontal pivots 13, and 14 at right angles to pivots 10 and 11. Said spider is provided with a pair of arms 15 which support the main frame work 16 of the compass.

Heretofore it has been the practice to suspend the follow-up system from said frame work and to mount the card underneath the same. I prefer, however, to mount the compass card 6 entirely above the spider so as to cover all parts of the compass beneath. For this purpose the outer follow-up frame 17 is provided with a central hollow stem 18 extending above the support 16 and to which the card is secured. Said stem is journalled for rotation in the enlarged central portion 19 of support 16 by a plurality of anti-friction bearings 20, 21 and 22, at least one of which, 21, acts as a thrust bearing to support the weight of the compass. From the top of said hollow stem 18 is suspended a bundle of fine wires 21', said wires being secured at the top within adjustable member 23 and supporting at the bottom the vertical ring 24 of the compass. Within said ring is supported in the usual manner the rotor casing 25 on horizontal pivots 26.

The follow-up frame 17 has secured thereto the usual large gear 27 which is driven by reversible motor 28 operating through reduction gears 29, said gears also being provided with an eccentric groove 30 for the purpose of applying corrections to the compass reading. For this purpose, a correction mechanism 31 of any desired form is shown as secured to the exterior support 16, said mechanism having an arm 32 pivoted at its lower end having a roller 33 engaging said eccentric groove. It would be evident that as the ship turns, the eccentric groove will rotate lever 32 and thereby effect the movement of the reference or lubber ring 34 after the correction device has been set for the proper speed and latitude of the ship which will readily be understood by those skilled in the art.

As above stated the motor for driving the rotor is preferably of the direct current type. As shown, the rotor 35 is supported on a central shaft 36 journalled at each end in the enclosing casing 25. The rotor proper is secured slightly to one side of the center of the shaft to make room for the motor armature 38 and commutator 39 placed directly on the shaft. The rim of the rotor, however, extends laterally toward and beyond the center of the shaft. The field poles 40 and 41 project from the side of the casing within the overhang of the rotor rim so that the rotor substantially encloses the armature and poles. Preferably, the motor is of the bi-polar type. Ventilating apertures 42 and 43, the upper one of which may be covered by screen 44 provide free circulation of air within the casing so that the motor may be properly cooled. No provision is made, therefore, for exhausting the casing of air, the motor being made of sufficient power and of sufficient cooling characteristics to drive the heavy rotor at sufficient speed against air friction.

Figure 6:
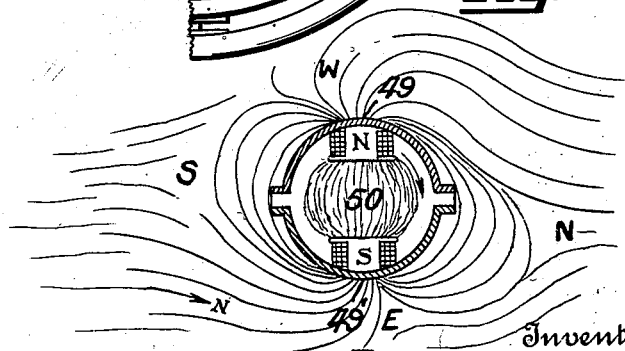
Fig. 6 is a diagrammatic view illustrating the effect of the earth's magnetic field on a direct-current motor.

I have found by many experiments that in all direct current motors there is a leakage of flux 49, 49' from the outside of each of the poles N, S as indicated in Fig. 6 although, of course, the larger portion of the flux flows between the poles as shown at 50. While such leakage causes little or no trouble in the average motor; in a gyro compass it may cause serious difficulty since the magnetic field set up thereby would be influenced by the magnetic field of the earth unless precautions were taken to prevent the same. Thus, in a bi-polar type motor with the poles arranged horizontally and the motor placed with the armature shaft extending north south, the magnetic field between the poles would be disturbed by the earth's field so that a torque would be exerted on the motor when the compass is really pointing north, thus causing a deflection of the gyro compass if said motor were driving the same. This condition is represented diagrammatically in Fig. 6 wherein a torque would be exerted in the direction of the arrow. By arranging the poles substantially vertical, however, I find that the effect of the earth's field is reduced to a minimum, since the lines of force then cross each other substantially at right angles so that there is no deflection except that due to the inclination of the earth's field or the magnetic "dip". This last force being about the horizontal axis and slight does not affect a gyro compass to nearly as great an extent as a torque about the vertical axis. However, in order to further reduce the effect of the earth's field, including both horizontal and vertical components, I prefer to encase the entire gyroscopic compass in magnetic material, as above described. By such or similar means, not only is the influence of the earth's magnetic field reduced to a minimum but also the influence of any other magnetic field in the vicinity of the compass, such as that due to heavy currents passing through bus bars near the compass etc. Also it will be understood that the magnetic shield employed may be the ship's hull itself, where it is possible to arrange the compass so as to be substantially surrounded by iron, as on a submarine.

For imparting meridian seeking properties to the compass, I prefer to substantially balance the casing 25 about pivots 26 and to pivot on the follow-up frame 17 by means of pivots 63, a support or ring 64 carrying a pair of containers 65, 66 adapted to contain a heavy liquid, such as mercury. Said containers are connected by a tube 67 of small bore, the theory of operation being fully set forth in the U. S. patent to Harrison et al. No. 1,362,940—"gyroscopic compass", filed December 21, 1920. Said ring 64 is connected to the gyro-casing 25 eccentrically by means of pin 68 on arm 69 so that no separate damping means is necessary. The employment of the "mercury ballistic" in connection with a direct current gyro-compass has especial advantages since a slight wear in the commutator or brushes of the driving motor resulting in lessening the weight on one side of axis 26—26 will not result in a material out of balance condition on which acceleration forces may act, but will merely cause a slight interchange of the mercury until a new position of equilibrium is reached with the mercury level as before.

I also prefer to impart continuous oscillations of small amplitude to the follow-up element 17 as hereinafter described. Said element as above stated, supports the mercury containers on pivots 63. The continuous oscillation of the follow-up element consequently maintains the mercury containers in a state of oscillation and thereby prevents surface tension or any tendency of the mercury to adhere to the walls of the containers or connecting tube 67, from affecting the sensitiveness of the apparatus, since the continuous oscillations break down any temporary condition of this nature and assure the fact that at all times the surface of the mercury in the two containers lies in the same horizontal plane.

In my design of gyro-rotor and casing, I have succeeded in producing a more symmetrical casing than heretofore by reducing the diameter of the rotor, and increasing the length of the rotor shaft to make room for the commutator, etc. In addition, the rotor end 121 of the casing is made to conform substantially to the commutator end 122, the object being to secure as equal moments about all axes as is mechanically possible. In addition to making the rotor casing symmetrical, I prefer to secure compensating weight 62 and 62' to the vertical ring 24 for the purpose of equalizing the moments of inertia about all axes due to the stabilization of the rotor casing, as explained in Patent 1,499,322 issued June 24, 1924, to Harry L. Tanner.

For driving the rotor, the repeater system and the follow-up system, I prefer to employ the same line voltage (65–70 volts) so that no auxiliary machinery need be employed and the number of wires entering the compass reduced to a minimum, thereby reducing the number of slip rings 120 on the compass to four. Heretofore, it has been the practice to employ 90 volts A. C. for the rotor and 20 volts D. C. for the follow-up and repeater systems. To handle the higher voltage employed in my follow-up system, I have devised improved reversing contacts for the follow-up frame. As shown, a pair of reversing contacts is secured to each side of the frame 17 while cooperating trolleys 70 are secured to oppositely extending arms 71, 72 of vertical ring 24. Such parts are shown in detail in Figs. 2 to 4. The trolley wheel is composed of a small wheel 75, preferably of aluminum to reduce weight, and a rim 76 of gold, or similar metal. The hub thereof is provided with an inserted metal bearing block 77 of special characteristics, each end of the bearing pin being provided with a counter bore 79. Taking in said bores are a pair of small pins 80, 81 extending oppositely from spring-fork 90 pivoted at 91, 92 to block 93. Pressure of the trolley is supplied by a spring 95 extending between arm 96 of the spring fork 90 and pin 97 on bracket 93. Since the bearings of the trolley cannot be lubricated without interposing resistance in the circuit, I prefer to employ two metals for the pins and bearing points having low coefficients of friction without sacrificing wearing qualities. I have found German silver an excellent metal for the block 77, when used in connection with Monel metal pins 80, 81. Bracket 93 is detachably clamped to arm 71 or 72 as by means of bolt 100 and nut 101, a tongue and groove connection 103 being provided between said bracket and base 102 so that the trolley will also be properly aligned. A set screw 104 may also be provided for adjusting the trolley in a vertical plane.

The contact blocks proper, which cooperate with each trolley comprise a pair of spaced blocks of metal (not shown) and mounted in a block of insulation 84 detachably and adjustably clamped to the bracket 85. The blocks preferably have a base of a baser metal, but adjacent the insulating space, I prefer to insert strips of pure tungsten or like metal such as molybdenum, so that the break occurs on tungsten to gold. Remarkable results have been obtained with this combination, the remarkable conductivity, comparative softness, smoothness and ductility of the gold complementing and cooperating with the harder, tougher and high resistance tungsten to produce a make and break contact of exceptional wearing qualities. Such a contact has especial adaptation to compass work since in this type of compass wherein a continuous "hunting" of the frame takes place, contact is made and broken at least three times a second, which in one month of continuous operation amounts to about 7,800,000 contacts. The adjacent edges of the tungsten blocks are sharpened to form knife edges, the edge being substantially unaffected by the constant rolling back and forth of the softer gold trolley and the constant making and breaking of electric contact. Obviously, any metal of like properties to gold may be used for the trolley is desired, such as silver or copper; both of which are good conductors and comparatively soft, but gold possesses the superiority of not tarnishing and keeping its surface smooth and bright even though sparking occurs at the surface thereof. A further aid to the wearing quality of these contacts is the fact that during the continuous oscillations of the follow up support carrying the contact blocks, the trolley slowly revolves on pivot pins 80, 81, thus presenting continually a new wearing face. The cause of this rotation or "creeping" has been found to be due to the fact that more pressure is exerted on the trolley wheel in one direction than the other due to the fact that pivots 91, 92 are to one side of pins 80, 81 and to the action of spring 95. As shown in Fig. 2, in one direction the trolley is subjected to a wedging action because when the contact-blocks are being pushed downwardly in Fig. 2, the moving force has a component forcing the trolley against the face of the contact blocks, thus increasing the pressure on the roller. On the return stroke the moving force has a component in the opposite direction, thus lessening the pressure exerted by spring 24. The result is that there is more tendency to slip in one direction than in the other, resulting in the creeping effect above described. This feature and the construction of the trolleys and contacts are not claimed herein but are reserved for my divisional application No. 609,329, filed December 27, 1922.

In accordance with the provisions of the patent statutes, I have herein described the principle of operation of my invention, together with the apparatus, which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent is:—

1. In a gyro-compass, the combination with a gyro-rotor, of a direct current motor for driving the same having a single pair of poles arranged substantially vertically for the purpose specified.

2. In a gyro-compass, the combination with a gyro-rotor, of a direct current motor for driving the same having a single pair of poles arranged substantially vertically and a shield of magnetic material around said compass for the purpose specified.

3. In a gyro-compass, the combination of a supporting means rotatable about a vertical axis, of a unitary rotor and driving motor, a casing therefor in which the rotor is journalled, said casing and its supported parts being substantially symmetrical about all axes, and masses supported by said means to compensate for the stabilizing action of the rotor on the casing.

4. In a direct current gyro-compass, a sensitive element mounted for turning about a vertical axis and oscillation about a horizontal axis, including a direct current motor having a commutator for driving the rotor, and liquid containers connected with said element to impart meridian seeking properties to the compass and to automatically restore equilibrium to the compass, if it is disturbed by commutator wear.

In testimony whereof I have affixed my signature.

CHESTER B. MILLS.